April 22, 1941.    R. ERBAN    2,239,087
FRICTION TRANSMISSION MECHANISM
Filed Oct. 28, 1938    3 Sheets-Sheet 1
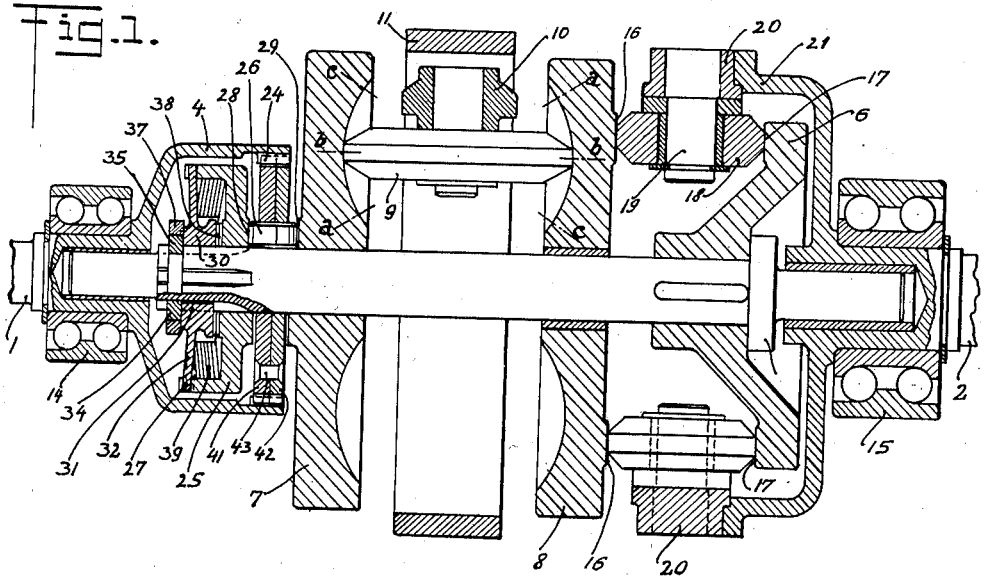
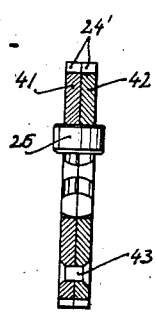
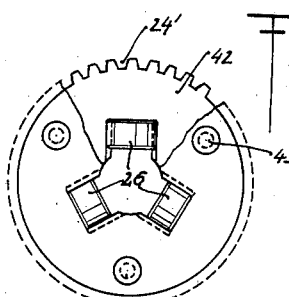
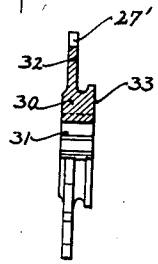
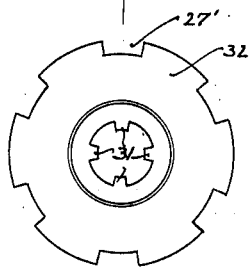
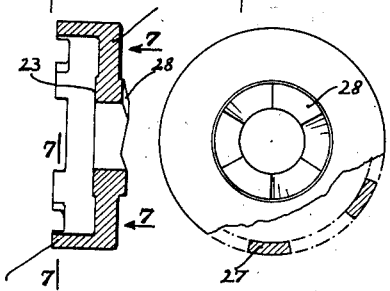
INVENTOR
Richard Erban April 22, 1941.   R. ERBAN   2,239,087
FRICTION TRANSMISSION MECHANISM
Filed Oct. 28, 1938   3 Sheets-Sheet 2
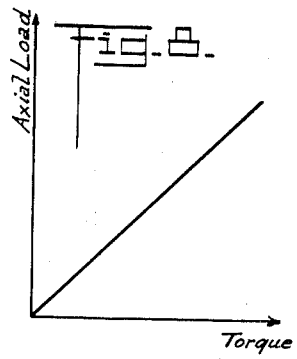
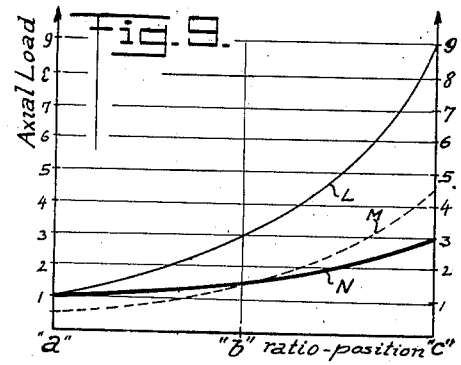
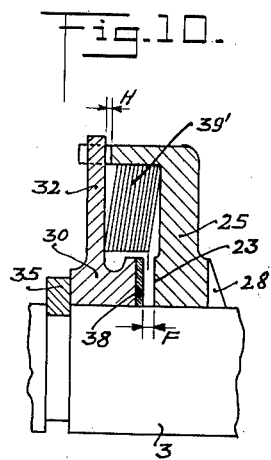
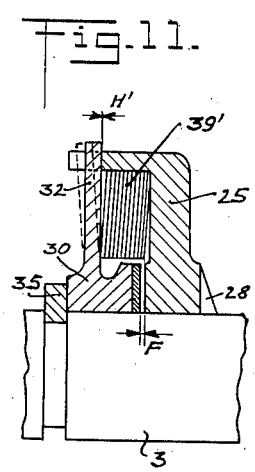
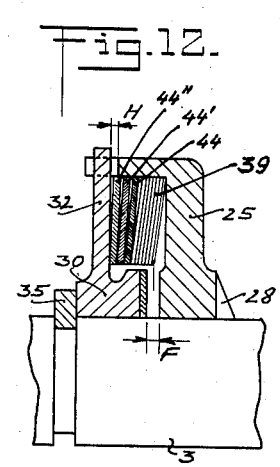
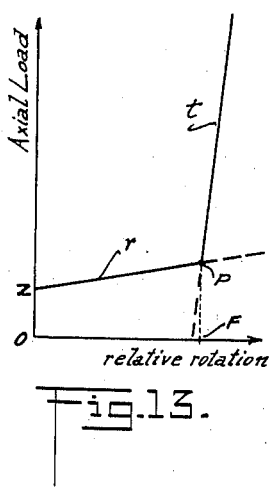
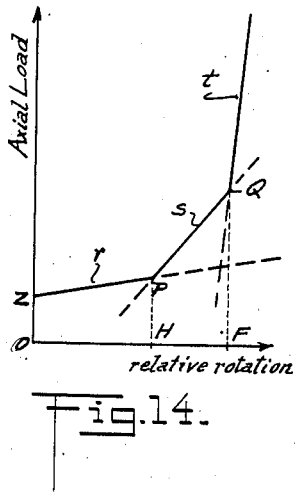
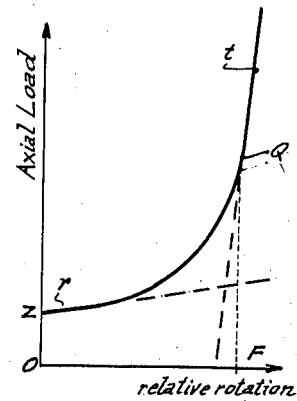
INVENTOR
Richard Erban April 22, 1941.   R. ERBAN   2,239,087
FRICTION TRANSMISSION MECHANISM
Filed Oct. 28, 1938   3 Sheets-Sheet 3

INVENTOR
Richard Erban

Patented Apr. 22, 1941

2,239,087

UNITED STATES PATENT OFFICE 2,239,087

FRICTION TRANSMISSION MECHANISM

Richard Erban, New York, N. Y.

Application October 28, 1938, Serial No. 237,379

12 Claims. (Cl. 74—208)

This invention comprises improvements in or relating to friction transmission mechanisms. More particularly, the invention relates to devices for producing the contact pressure in such transmissions where it is desirable to vary the contact pressure in accordance with the varying operating conditions of the transmission.

It has been found that it is important to regulate the contact pressure so that there is enough pressure to prevent slippage between the parts in frictional engagement, and also so that there is not imposed upon those parts an excessive pressure, that is, a pressure much greater than that which is required to prevent slippage. Such excessive pressures, when imposed, will not only cause additional losses of the power transmitted, but they will also reduce the power transmitting capacity of the transmission. In other words, the transmission would become less efficient and bigger, more expensive.

It has further been found that such conditions of excessive contact pressures exist particularly in connection with transmissions of the race and roller type, where a conventional torque loading device is used responsive to the torque of one of the races. In such cases, correct loading is obtained only for one speed ratio and excess of pressure prevails over the remaining range of the speed ratio.

This invention has for one of its objectives a torque loading device which will avoid the difficulties mentioned and which will produce in connection with a race and roller transmission of the type referred to, a modified contact pressure which closely follows the requirements for greatest power transmitting capacity for a given transmission. This capacity may by the use of this invention be greatly increased while the size of races and rollers and their relative position remain unchanged.

A torque loading device of conventional design usually comprises two axially spaced elements angularly movable relatively to each other and interposed members, mostly in the form of balls or rollers, for causing axial separation of the said spaced elements in response to such relative angular movement. In a device of this kind, the axial load produced is usually in a constant proportion to the torque applied to cause the relative angular movement, or in other words, the torque-load characteristic of the device is a straight line.

It has previously been pointed out that such straight proportionality of the axial load to the torque of a race will not correspond to the requirements of a wide speed range and it is therefore one of the objectives of this invention to change the torque-load characteristic in response to changes in the speed ratio of the transmission whereby the contact pressure between the rollers and the races will be modified accordingly to the requirements for high efficiency and greatest power transmitting capacity for a given transmission.

In the embodiment of the invention herein disclosed, the desired change is effected by means of the transmission of an auxiliary torque directly to the interposed members of the torque loading device, whereby such auxiliary torque is a torque other than the torque which these members may transmit from one of the spaced elements to the other; or, depending upon the specific arrangement of the torque loading device with respect to the transmission, as the case may be, an auxiliary torque may be withdrawn directly from the interposed members, while they are transmitting the torque between the spaced elements. In either case, the axial load produced by the torque loading device, in accordance with this invention, will be responsive to the combined action of the torque transmitted between the spaced elements and of the torque transmitted directly to or from the interposed members. Therefore this axial load may be greater or smaller than that load which would be generated were there no auxiliary torque transmitted to the interposed members.

The embodiment herein disclosed is illustrated in its application to what is known in the art as a differential transmission of the toric race and roller type, and more specifically to an arrangement wherein the speed of the output shaft may be varied continuously from a forward speed down to standstill and on through standstill to increasing speeds in the reverse direction of rotation. This specific type of transmission has been selected only for the purpose of conveniently illustrating the invention and its application in a specific case; it is however obvious that the invention is not limited in its application to this specific type of transmission and it is to be understood that this invention may be applied to and incorporated in other forms of race and roller transmissions, for example, such as have a speed ratio range between standstill and a maximum speed in one direction of rotation only, or also such transmissions where the ratio can be changed only between two speeds in one and the same direction of rotation of the output shaft.

Another object of this invention is a torque loading device of simple design and a construction which is easy to assemble and to adjust.

A further object of this invention is an improved construction of a torque loading device which will produce a gradual change of the axial load imposed upon the transmission, even if the changes of the respective torque are of such character as would normally cause difficulties through shock-loads, objectionable noise, pitting of the cam surfaces, etc. In order to avoid these difficulties, this invention provides a new combination of a torque loading device with resilient means, whereby the resultant load-deflection characteristic gradually leads from the comparatively flat deflection line at low loads to the much steeper deflection line for higher loads, avoiding sharp angles or corners in the deflection line.

Other objections and advantages will in part be obvious and will in part be pointed out in the following description of an embodiment of the present invention illustrated in the drawings wherein:

Fig. 1 is an axial section of a transmission embodying the invention;

Fig. 2 is an axial section of one of the elements of the torque loading device;

Fig. 3 is a transverse view of the elements shown in Fig. 2, showing one part thereof in transverse section;

Fig. 4 is another element of the torque loading device shown partly in axial section and partly in axial view;

Fig. 5 is a transverse view of the element shown in Fig. 4 as seen from the left side;

Fig. 6 is an axial section of still another element of the torque loading device;

Fig. 7 is a transverse view of the element shown in Fig. 6, as seen from the right side, and also a fractional section;

Fig. 8 is a diagrammatic illustration of a straight line torque-load characteristic;

Fig. 9 is a diagram illustrating the relations between axial load and speed ratio;

Fig. 10 is a fragmentary axial section of some elements of the torque loading device in a certain position of operation, shown in enlarged scale;

Fig. 11 is a fragmentary axial section of the same elements as shown in Fig. 10 in another position of operation;

Fig. 12 is a fragmentary axial section of a modification of the arrangement shown in Fig. 10;

Figure 16:
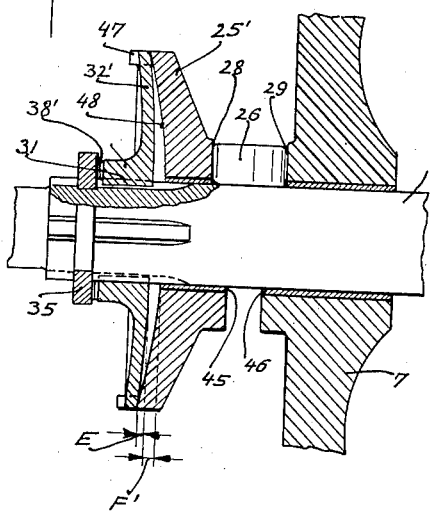
Figure 17:
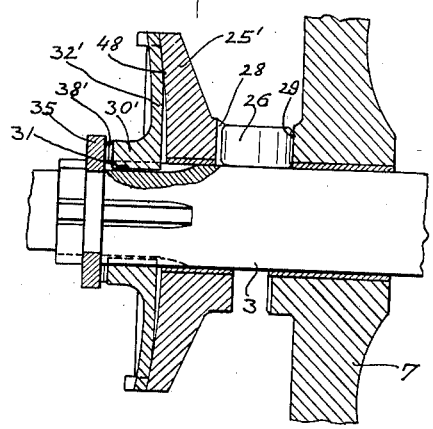
Figure 18:
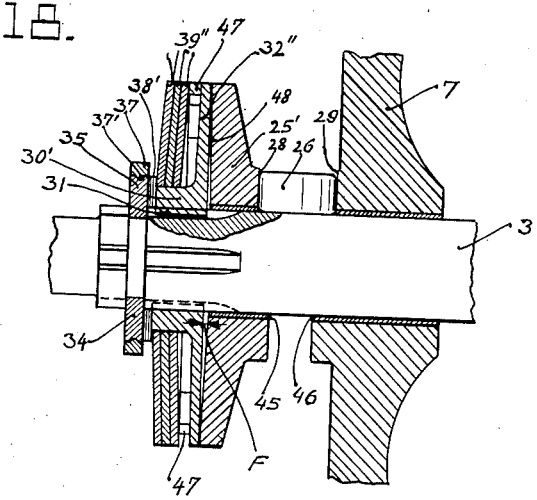

Figs. 13, 14, and 15 are diagrammatic illustrations showing the relation between axial load and relative angular rotation for three specific constructions of torque loading devices;

Figs. 16, 17, and 18 show fragmentary sections of further modifications of the torque loading device.

It is to be understood that the embodiment of this invention herein illustrated and described is merely for the purpose of convenience of description and disclosure and that the scope of this invention is not to be construed as limited thereby except insofar as limitations are called for by the specific language in the claims.

In Fig. 1, two races 7 and 8 with toroidal surfaces are shown rotatably mounted upon a shaft 3. This shaft 3 is journalled so that it can rotate relatively to the driving shaft 1 and the driven shaft 2. Between the races 7 and 8 are rollers 9 in frictional driving contact with the races; only one such roller 9 being shown. The roller 9 is rotatably mounted in a yoke 10, which in turn is tiltably carried by a frame 11. This frame is stationary and may be connected to the transmission housing (not shown). The mechanism for mounting and tilting the rollers 9 for ratio changing purposes is no part of this invention and is omitted from the drawings to avoid confusing details; it may be constructed in any desired or preferred manner, for example, in the way disclosed in United States Patent No. 1,859,502, or Patent No. 2,125,999.

For the purpose of describing the operation of the invention as disclosed herein, it is sufficient to consider three main positions of the roller 9; one of these is that shown by the roller and marked "b—b" and it corresponds to a 1:1 speed ratio between the recess 7 and 8 relatively to each other; another position is marked "a—a" and corresponds to a speed ratio at which race 8 rotates at ⅓ of the speed of race 7; while still another position is marked "c—c" and denotes a ratio at which race 8 rotates 3 times faster than race 7.

A set of rollers 18 is in rolling contact with the raceway 16 of race 8 on one side and with the raceway 17 of the element 6 on the other side. Element 6 is keyed to the shaft 3 and supported by the shoulder 5. The rollers 18 are rotatable upon shafts 19, which in turn, are mounted radially in a ring 20. A bell-shaped extension 21 of the driven shaft 2 is driveably connected to the ring 20, which thereby is rotatable concentrically with respect to the shaft 3. The driven, or output shaft 2 is suitably supported by the bearing 15. The race 7, which is free to rotate relatively to the shaft 3, has on its outer face a set of inclined or helical cam surfaces one of which is shown in Fig. 1 marked 29. Axially spaced therefrom is an element 25, which provided with another set of inclined cam surfaces, as indicated at 28, in opposed position to the cam surfaces 29. The element 25 is shown more in detail in Figs. 6 and 7 and these figures clearly show a set of three V shaped cam surfaces. The element 25 is mounted upon the shaft 3 so that it can rotate and slide axially relatively thereto; the outer, cylindrical part of element 25 is provided with sectional recesses whereby toothshaped portions 27 extend to the left of the disclike portion, which has on its inner part an abutment 23. Interposed between the cam surfaces 28 and 29 are three rollers 26. A drive member, composed of two discs, 41 and 42 held together by rivets 43, is rotatably journalled upon the shaft 3. The discs 41 and 42 are provided with pockets constructed to transmit power to each of the rollers 26 and to hold each roller 26 in its correct position between the cam surfaces 28 and 29. The circumference of this drive member 41—42 is provided with gear teeth or splines 24', whereby a torque may be transmitted to the rollers 26. A bell shaped extension 4 of the driving shaft 1 has internal teeth 24, engaging the teeth 24' on the member 41—42. Thus a torque transmitting connection is established between the driving shaft 1 and the rollers 26 through the drive member 41—42. The driving shaft 1 is supported in the bearing 14 and is rotatable relatively to the shaft 3. To the left of the element 25 and slightly spaced therefrom is a coupling element which consists of a hub-like part 30 and a disc-shaped part 32. The hub 30 is connected to the shaft 3 by splines 31. Figs. 4 and 5 show this coupling element in detail. The hub 30, on its right side, is provided with an abutment 33; interposed between this abutment 33 and the abutment 23 of the element 25 is a shim 38 adapted to adjust the relative position of the elements 25 and 30 respectively. The coupling element 30—32 is held against axial displacement on the shaft 3 by a snap-ring, consisting of two pieces 34—35, which are held in place by the ring 37.

The disc-shaped part 32 of the coupling element has on its periphery notches 27', which engage the tooth-like portions 27 which extend from the element 25. In this way, a torque transmitting connection is formed between the shaft 3 and the element 25. The disc portion 32 is made comparatively thin, so that it is resilient and deflects like a spring when the element 25 moves to the left and bears against the periphery of the disc 32. Such deflection is shown in Fig. 1, where the disc-portion 32 is shown bent to the left, while the undeflected position is indicated in dotted lines. This deflection is more clearly seen in Fig. 11, where the deflected position is shown in dotted lines. Fig. 4 shows the coupling disc 32 without deflection.

Additional springs 39 are interposed between the coupling disc 30—32 and the element 25; these springs 39 are provided with a deflection characteristic that is different from that of the coupling disc 32, and preferably these springs 39 are so constructed that their characteristic is not a straight line; the combined deflection curve of the spring-like coupling-disc 32 plus the additional springs 39 is a curve of peculiar shape, that leads gradually from a soft to a stiff spring-characteristic, as will be later more fully explained.

The cam surfaces 28 and 29 have a constant pitch, or helical angle, so that the axial force produced by this device tending to separate the cam surfaces 28 and 29 will increase and decrease in direct proportion to increases and decreases of the torque that is applied to these cam surfaces tending to rotate them relatively to each other. The axial separating force is also the axial load imposed upon the transmission, and this relation between the axial load and the torque is shown in a diagram in Fig. 8, which explains the term "straight-line torque-load characteristic," as used in this description. It is clear that with such a device, the pressure produced will be doubled whenever the torque applied is doubled, and so on.

In order that the operation of the new mechanism may be readily understood, it is advisable to consider at first the operation and the axial loads produced in a transmission system of similar design, but which uses the conventional torque loading device in the conventional way of application.

Such a simplified system can be obtained from the one shown in Fig. 1, if the drive member 41—42 is omitted, the bell-shaped extension 4 and the shaft 1 are taken out, the shaft 3 extended to the left to serve as a driving shaft, and the remaining elements 25, 30—32, 39 and including the cam surfaces 28—29 replaced by a cam surfaced element of a conventional torque loading device.

In such a simplified arrangement, which is known in the art, the axial load is produced in a straight line proportion to the torque which is transmitted through the torque loading device, that is the torque transmitted between the shaft 3 and the race 7, regardless as to whether the torque is transmitted from the shaft to the race, or vice versa.

The transmission shall be considered when operated under conditions where the torque upon the output shaft 2 is of constant value. It then follows that the torque upon each of the elements 6 and 8 will also be of constant value, whereby each of them is just one half of the value of the output-shaft-torque.

With a torque of constant value upon the race 8, it is evident that the torque upon the race 7 will vary with the changing of the position of the rollers 9. For the purpose of this consideration, and for the convenience of describing the operation, the value of the torque of race 8 shall be fixed at three units. Inspection of Fig. 1 will show that for the rollers 9 in posiiton $b$—$b$, the torque upon the race 7 will be three units; for the rollers 9 in positon $a$—$a$, the torque of race 7 will be one unit; and for the position $c$—$c$, the torque of race 7 will be nine units.

Now, in a transmission system with a conventional torque-loading system between the race 7 and the shaft 3, the axial load produced is in a straight line proportion with the torque of race 7. Therefore, the axial load for the rollers 9 in the speed ratio position $a$ will have the relative value "one" (load unit). For the position $b$, the axial load will be "three" (load units), and for the position $c$, the axial load will be "nine" (load units). This is illustrated in Fig. 9 in which a curve marked L gives the axial loads for different ratio positions of the rollers 9. Further consideration of this diagram will show that the axial load according to the curve L causes excessive contact pressures between the race 7 and the rollers 9 in all positons except the position marked $a$. It must be remarked here, that, again for purposes of simplified consideration, the influence of the "wedging-effect," which increases the contact pressure due to the inclination of the rollers, will be disregarded and the following considerations made as if the sum of the contact pressure on each roller would correctly correspond to the axial load; for the tilting angles shown in the drawing, which are taken from machines in practical use, the difference is under 15%.

Under these conditions, we find that the load in the position $b$ is 200% of that which is required. This is due to the fact that the active radius of the rolling contact for the position $b$ is twice the radius of position $a$, so that only one half the contact pressure is needed for transmitting a given torque in position $b$ as compared with position $a$; since the torque in position $b$ is three times that of position $a$, the axial load (and therewith the contact pressure) for position $b$ should be one and one half times greater than for position $a$, instead of three times greater as we found it to be. For the position $c$, we find that the axial load has a relative value of "nine", while for the transmission of the torque only an axial load of a value of "three" would be required. This is due to the fact that the active radius of the roling contact for position $c$ on race 7 is three times greater than the radius for position $a$. In this position $c$, we find therefore that the axial load imposed is three times that which is required. The required axial load is indicated in Fig. 9 by a heavy, full line marked N, and the difference between the line N and L represents the excessive axial load produced by the conventional construction over the entire range of speed ratios. It is obvious that with a transmission so loaded, only one third of the power capacity is obtained in position c and only one half in position b as compared with a transmission that is operated without excessive axial loads, and such greatly improved transmission is among the objects of this invention.

In the construction following the present invention as herein disclosed, the inclined or helical surfaces 28 and 29 are so arranged that the axial load produced will be just that which is required for the position b with no excess of load in this position. The cooperation between the rollers 26 and the inclined surfaces 28 and 29 would then produce an axial load characteristic as illustrated in Fig. 9 by the curve marked M (dotted line). This would be below the required load for all ratio positions from a to b, and it would be in excess of the required load for all ratio positions from b to c. However, in addition to the torque of the race 7 transmitted by the rollers 26 between the inclined surfaces 28 and 29, there is an auxiliary torque transmitted to the rollers 26 through the drive member 41—42. With the rollers 9 in the position a—a, the driving power is delivered in its entirety to the member 6, and the race 8 is driven through the rollers 18; as a consequence thereof, race 7 finds itself driven from race 8 through the rollers 9, and the torque which passes the torque loading device has the direction from the race 7 to the shaft 3. This torque of race 7, which in itself produces only an insufficient axial load, is now augmented by one half of the torque of the driving shaft, delivered to the race 7 through the elements 4, 41—42, and 26. The other half of the driving torque goes directly to the cam surface 28 and the shaft 3. This additional torque imposed upon the race 7 tends to rotate race 7 relatively to the shaft 3 in the same direction as did the torque transmitted to race 7 by the rollers 9, and the axial load thus produced is greater than before in proportion to the increase of the torque over its former value. A simple computation based upon the speed ratio indicated for the position a will show that the axial load produced by the combined action of the two torques corresponds correctly to the requirements presented by the curve N. As the ratio position of the rollers 9 is changed from position a to position b, the auxiliary torque automatically decreases and becomes practically zero exactly at the position b. The axial load produced in position b will therefore not be increased over its former value, which is fully corresponding to the requirements.

For all positions of the rollers 9 between the positions b and c, Fig. 9, the conditions are reversed. The axial load according to curve M is too great, and should be reduced to fit the demands of curve N. This also is accomplished by the present invention. Inspection of Fig. 1 will show that while the rollers 9 are in positions between b and c, the input power goes entirely to race 7, since for these positions the output shaft rotates in opposite direction to the input shaft. It will be remembered that curve M represents conditions where the shaft 3 was also the input shaft, so that the entire torque of shaft 3 passes through the torque loading cam surfaces 28—29 to the race 7. With the driving shaft 1 connected to the drive-member 41—42, this is no longer the case, and the torque of the driving shaft 1 is delivered directly to the members 26. Only one half of the torque of the driving shaft 1 reaches the shaft 3 and therefore, the total torque which passes through the cam surfaces 28—29 in order to produce axial load is reduced because of this deduction of one half of the torque of the driving shaft. The axial load is decreased in the same proportion as the torques and again, a short computation will prove that the difference is just what is required to bring the curve M down to coincide with the curve N. In this way, the present invention produces an axial load which correctly answers the requirements of furnishing a loading characteristic that will avoid excessive contact pressure over the entire speed range.

The operation of another improvement of a torque loading device shall now be described. The cam element 25 is provided with a smooth cylindrical bore which has a sliding fit upon the shaft 3; the transmission of torque between the shaft 3 and the cam-element 25 is effected by the resilient coupling element 30—32. This coupling element is splined to the shaft 3 by splines 31 and secured against axial displacement by the snap-ring 34—35, so that this coupling element 30—32 does not move relatively to the shaft 3 during operation of the device. One of the advantages of this arrangement is that the splines 31 are not subject to wear, which always occurs in such other cases where the splines are forced to slide back and forth under high specific loads. Another, and even more important improvement in the operation is the increased effectiveness and efficiency of the spring arranged "in series" with the torque loading device. In conventional designs, where the cam element is splined directly to the shaft and a spring arranged in series with the cam element, the spring has to overcome the friction and other resistance which is caused by the splines in order to move the cam element and press the races against the rollers. Repeated operation which subjects the splines to short back and forth movements under heavy load may even lead to pitting and scoring of the splines and completely block the action of the spring.

In the device herein disclosed, these difficulties are avoided by the spring-disc 32 and its tooth-like connection to the element 25; this construction transmits the torque from the shaft 3 to the cam element 25 directly and without the use of sliding splines. No frictional resistance has to be overcome by the spring, its action is therefore more effective and there is no danger of the spring-disc becoming locked through frozen splines.

A further improvement relating to torque loading devices and its operation shall now be described in connection with the illustrations of Figs. 10, 11, and 12 and with diagrams shown in Figs. 13, 14, and 15. As previously stated, Figs. 10, 11, and 12 show fragmentary axial sections of one of the cam elements of the torque loading device and of the resilient means cooperating therewith. The numerals designating the parts are the same as those employed in Fig. 1 for these same parts. It may be noted that the splines 31, which connect the coupling element 30—32 to the shaft 3 are not shown in order to avoid crowding the drawings. The coupling element 30—32 is supposed to be fastened to the shaft so that torque can be transmitted, and this may be done as shown in Fig. 1.

In Fig. 10 the cam element 25 is shown in a position where the torque transmitted through the torque loading device is zero, in other words, there is no relative rotation between the cam 28 and the cam 29 of Fig. 1. In that case, the cam element 25 is being pushed to its extreme right position by the spring 39'. This shall be termed the neutral position. This action of the spring 39' opens a gap, denoted F in Fig. 10, between the abutment 23 and the shim 38. A similar gap, denoted H, exists on the outside between the element 25 and the spring-disc 32 and for the first step of our consideration, we shall postulate that this gap H is a little wider than the gap F (contrary to the drawing). In the diagram of Fig. 13, the axial load created by the spring 39' in the neutral position of cam element 25 is represented by the distance O—Z. Now, when relative rotation between the cams 28 and 29 gradually increases, the cam element 25 is pushed to the left and deflects the spring 39', while the gap F gradually decreases until it reaches zero.

In Fig. 13, the deflection characteristic of the spring 39' is denoted with r; for the neutral position, the axial load is O—Z and this gradually increases to F—P for a relative rotation of the cam corresponding to O—F. From the point P on, the axial load increases by following the deflection characteristic of the transmission system, as denoted by t, and illustrated as a straight line; it may be remarked, however, that the deflection of a transmission system usually is somewhat curved, and the inclination of the line t may be considered as a measure for the average "stiffness" of the transmission system against axial deflection.

Where the term "stiffness" is used in connection with the deflection of a resilient member, such as a spring or other resilient part of the transmission, it is to be understood as defining the relationship of the increase of the load to the increase of the elastic deformation (or deflection) caused thereby. Under the terms of this definition, a cylindrical helical spring has a stiffness which does not change while the spring is being subjected to load and deflection; and the term "a stiffer spring" means that it requires a greater load to produce the same predetermined deflection with this spring than with another to which it is compared.

The acute angle at P of the composite characteristic r—t is a source of many difficulties when frequent and sudden changes of the torque occur. Conditions become particularly troublesome when the torque changes its direction in addition to its magnitude. During the relative rotation of the cam element from O to F there is only the comparatively small resistance of the spring pressure O—Z against axial movement of the cam element 25, and consequently, the sudden torque surplus accelerates the cam-element until it hits the abutment of the coupling element 30 and its axial as well as its rotational movement is suddenly nearly stopped. This represents a condition very similar to a hammer blow, where a moving mass is suddenly slowed down, and the effects are also similar. In light cases, there is objectionable noise, while in cases where heavier shock loads and more sudden torque increases occur, this causes pitting or brinelling of the cam surfaces and other parts of the transmission. The spring deflection together with the masses connected therewith also set up a mechanical oscillatory system, and where the torque-shocks occur in periods of a frequency that falls in tune with the natural frequency of this oscillatory system, the ensuing resonance may increase the load to the breaking point.

These difficulties are overcome by an arrangement of which a simplified form is illustrated in Figs. 10 and 11 in two different positions of operation. In Fig. 10, the gap H is shown to be smaller than the gap F. When the torque loading device is operated, so that the cam element 25 is pushed toward the left, it deflects the spring 39' and then closes the gap H, while the gap F is still open. This position is shown in Fig. 11 and is also represented by the point P in Fig. 14. Further movement of the cam element 25 will deflect the spring disc 32 in addition to the further deflection of the spring 39', until the gap F is closed. This corresponds to the deflection line from P to Q, denoted s in Fig. 14. The inclination of this line represents the "stiffness" of the combined springs 39' and 32. Beyond the point Q, the deflection characteristic follows the steep line t which represents the deflection of the transmission system, as has been explained in connection with Fig. 13.

The deflecting line in accordance with Fig. 14 shows a great improvement over the former, since it avoids acute angles, or in other words, there are no sudden changes in the stiffness of the system; still further improvements may be obtained by a construction which gives a gradually changing, or curved, deflection line, as disclosed and illustrated in Figs. 12 and 15. The spring elements 39 are so arranged that they come to bear one after another as the cam element 25 moves to the left. In Fig. 12 only three of such separately spaced elements are shown, denoted 44, 44' and 44'', but it is obvious that all of the spring elements employed, or any desired number of them, may be so constructed in order to obtain a deflection curve that gradually "stiffens" until it reaches the stiffness (or resiliency) of the transmission system itself.

A spring arrangement of this kind will act as a shock-absorber by spreading the sudden load increase caused by the "slowing down" of the element 25 over a wider angle of relative rotation. A further advantage is that it will prevent the building up of resonance oscillations in cases where the sudden torque loads occur in regular intervals or periods. An oscillatory system consisting of springs and masses has no definite natural frequency where the spring changes its stiffness over a great range, since each change in the spring characteristic causes a change in the frequency. This keeps it from getting in resonance with any periodical changes in the power transmitted to it.

Fig. 16 shows an axial section of a modified construction, which produces the curved deflection line as illustrated in Fig. 15. While Fig. 17 shows this same construction as Fig. 16 but with the various elements in a relative position corresponding to another stage of operation of the device. It must be pointed out in connection with these Figs. 16 and 17 that certain dimensions and clearances have been exaggerated in the drawings in order that various elements and their relationship to each other may be more clearly described, as will hereafter be more fully explained.

The element 25' is provided with the cam surfaces 28 and is slidable upon the shaft 3 by means of the anti-friction sleeve 45. This sleeve may preferably be made of a material of the oil-containing, self-lubricating type to prevent binding between the element 25' and the shaft 3. The race 7 may be provided with a similar sleeve 46. On its outside, element 25' is provided with extensions or teeth 47 which engage notches 47' on the circumference of the spring disc 32'—36'. The teeth 47 and notches 47' of Fig. 16 correspond to the teeth 27 and notches 27' of Figs. 4 to 7 respectively and operate in the same way.

The hub 30' of the spring disc 32' is splined to the shaft 3 by splines 31 while the axial position of the element 32'—30' on the shaft 3 is secured by the abutment 35 and the adjustable shim 38'. The spring disc 32' is shown in Fig. 16 in a slightly deflected state, the deflection against its unloaded, straight position is indicated by the arrow E. The cam element 25' has a concave inner surface 48 which bears against the spring disc 32' at its outer rim and leaves a wedge-shaped space toward the center. The maximum clearance between the element 32'—30' and the surface 48 of element 25' is denoted with F'. This gap F' is the maximum amount that the element 25' can move to the left until it is solidly supported by the hub 30' and the abutment 25. The concavity of the surface 48 and the size of the gap F' are illustrated at an exaggerated scale and shown many times their actual size, for a torque loading device of the size shown.

It may be seen from Fig. 16 that the active length of the spring 32' is the full radial width from the hub 30' to the periphery of 32' which bears against the outer rim of the element 25'; therefore, the spring characteristic is comparatively flat, and since the deflection is at its minimum (E), the axial load is small. This position corresponds to the point Z in the diagram shown in Fig. 15.

Relative angular rotation of the element 7 with respect to the element 25' will cause the rollers 26 to climb on the cam surfaces 28 and 29 as has been explained previously; this will push the element 25' to the left and increase the deflection of the spring disc 32'. As this deflection increases, the outer portion of the spring 32' becomes more and more conformed to the concave inner surface 48 of the element 25', so that it lies against it without any clearance. This is illustrated in Fig. 17, where the spring disc 32' is so deflected that its outer half follows the curvature of the surface 48. It is evident that in such case the active length of the spring is reduced to about one half its former value and that consequently the deflection characteristic is stiffer than it was before. This "stiffening" of the spring 32' continues until the element 25' bears fully against the entire spring 32'. Beyond this state, the spring 32' cannot be further deflected and this position is illustrated by the point Q of Fig. 15. Beyond the point Q, the spring 32' does not add any resiliency to the steep deflection characteristic of the transmission system (line $t$ of Fig. 15). It becomes apparent from the above description that since the reduction of the active length of the spring is very gradual, and may follow any desired law by using a suitable curvature for the surface 48, the stiffening of the deflection curve will be equally gradual and in accordance with the predetermined law.

Fig. 18 illustrates a modification of the construction shown in Fig. 16, whereby the initial pressure is produced in part or in full by the auxiliary springs 39". The spring disc 32" is slightly tapered towards the outer circumference and transmits the torque from the shaft 3 to the cam element 25'. The hub 30' of the spring disc 32' is held against axial displacement by the two-part abutment 34—35. A snap-ring 37, provided on its inner side with a ridge 37', holds the parts 34 and 35 in place while the ridge 37' prevents the ring itself from falling off. The wedge shaped gap between the spring disc 32' and the element 25' has the maximum value F, which is also the maximum deflection of the spring 32'. This construction will also produce a load characteristic in accordance with Fig. 15.

It will be appreciated that the invention is not limited in its application to the specific type of transmission disclosed in Fig. 1, nor need the different phases of the invention be used in combination, as shown in Fig. 1, and it is to be understood that for example the improvement disclosed in Figs. 4 and 5 may be employed without the construction disclosed in Figs. 10, 11 and 12, or that the latter improvements may be used in connection with any torque loading device, whether or not it is built along the lines described in connection with Fig. 1 for changing the torque-load characteristic.

What I claim is:

1. In a variable speed friction transmission, a driving shaft, a driven shaft, an intermediate shaft, races coaxial upon said intermediate shaft, rollers mounted between said races and in driving contact therewith, means to change the point of contact between the rollers and races to vary the ratio of the transmission, an element connected to said intermediate shaft and having cam surfaces thereon, cam surfaces provided on one of said races, rolling bodies interposed between said first named cam surfaces and said second named cam surfaces, and means to drive the said interposed rolling bodies from one of the two first named shafts.

2. A variable speed friction transmission comprising a driving member, a driven member, a plurality of coaxially mounted races spaced apart from each other, rollers in driving contact with said races, two of said races adapted to rotate in the same direction and at substantially the same speed while being movable angularly relative to each other, torque loading cams drivably connected to said angularly movable races respectively, means interposed between said torque loading cams for causing axial separation thereof in response to relative angular movement, and means for drivably connecting one of said members with said interposed means.

3. In a torque loading device for a friction transmission system, the combination of axially spaced elements, interposed means for causing axial separation of said elements in response to a relative rotary movement of said elements, a carrier for said interposed means rotatable relatively to said axially spaced elements and means adapted to deliver a driving torque to said carrier.

4. A torque loading device for a friction transmission system, comprising axially spaced elements having cam elements thereon relatively rotatable with respect to each other, rolling bodies interposed between said elements, and a drive member relatively rotatable with respect to each of said elements, said drive member being adapted to transmit power to said interposed rolling bodies and to move said bodies tangentially with respect to said elements.

5. In a friction transmission system, the combination of a torque loading device to impose axial load upon the transmission, said device comprising a drive member, a set of rolling bodies rotatively mounted on said drive member, cam faced members relatively rotatable with respect to said drive member and contacting said rolling bodies at substantially opposite sides thereof, and means for transmitting power to said drive member.

6. In a friction transmission system, in combination, a shaft, a torque loading device for imposing axial load upon said system, said device comprising cam-faced elements mounted slidably and rotatably upon said shaft, an abutment for one of said cam-faced elements fixed to said shaft, said abutment having an axially deflectable portion integral therewith adapted to transmit torque between said abutment and said one cam-faced element.

7. In a friction transmission system, in combination, a shaft, a torque loading device for imposing axial load upon said system, said device comprising cam-faced elements mounted slidably and rotatably upon said shaft, a torque load sustaining member adapted to serve as a support for one of said cam faced elements, said member having a portion thereof axially deflectable and adapted to transmit torque to said cam faced elements.

8. In combination with a friction transmission system, a torque loading device for imposing an axial load upon said system, a disc-shaped spring member arranged in series with said torque loading device to cause an initial load upon said system, said spring member having an inner portion adapted to transmit torque thereto and providing an abutment to determine the limit of the axial movement of said torque loading device while the outer portion of said spring member produces said initial load.

9. In a friction transmission system, in combination, a torque loading device for imposing a load upon said transmission system in response to the torque transmitted, and a resilient means having varying degrees of stiffness in its normal range of operation whereby said means is adapted to impose an initial load upon said transmission system.

10. A friction transmission system, comprising a torque loading device to impose a load upon said system, and a spring arranged to produce an initial load upon said system, said spring being constructed to deflect as the torque load varies and to gradually increase its stiffness in response to the increase of deflection.

11. In combination with a friction transmission mechanism, deflectable means for imposing a load upon said transmission mechanism, means for varying the deflection of said deflectable means in response to varying operating conditions of said transmission mechanism, and means including said deflectable means for producing a substantially curved load-deflection characteristic within the range of normal operations.

12. In a friction transmission system, in combination, a torque loading device for imposing a load upon said system in response to the torque transmitted, a spring means for imposing a load upon said system independent of the said torque, and means for rendering ineffective a portion of said spring in response to an increase of the load.

RICHARD ERBAN.